Jan. 1, 1946.  A. F. SHIELDS  2,392,005
PARTITION ASSEMBLING MACHINE
Filed May 3, 1941  7 Sheets-Sheet 1

INVENTOR.
Albert F. Shields
BY
ATTORNEY.

Jan. 1, 1946.  A. F. SHIELDS  2,392,005
PARTITION ASSEMBLING MACHINE
Filed May 3, 1941  7 Sheets-Sheet 2

INVENTOR.
Albert F. Shields
BY
ATTORNEY.

Jan. 1, 1946.　　　A. F. SHIELDS　　　2,392,005
PARTITION ASSEMBLING MACHINE
Filed May 3, 1941　　　7 Sheets-Sheet 3

FIG. 5.

INVENTOR.
Albert F. Shields
BY
ATTORNEY.

Jan. 1, 1946.  A. F. SHIELDS  2,392,005
PARTITION ASSEMBLING MACHINE
Filed May 3, 1941  7 Sheets-Sheet 4

INVENTOR.
Albert F. Shields
BY
Samuel Ostrolenk
ATTORNEY.

Jan. 1, 1946. A. F. SHIELDS 2,392,005
PARTITION ASSEMBLING MACHINE
Filed May 3, 1941 7 Sheets-Sheet 5

INVENTOR.
Albert F. Shields
BY
Samuel Ostrolenk
ATTORNEY.

Jan. 1, 1946.  A. F. SHIELDS  2,392,005
PARTITION ASSEMBLING MACHINE
Filed May 3, 1941   7 Sheets-Sheet 6

INVENTOR.
Albert F. Shields
BY
ATTORNEY.

Jan. 1, 1946. A. F. SHIELDS 2,392,005
PARTITION ASSEMBLING MACHINE
Filed May 3, 1941 7 Sheets-Sheet 7

INVENTOR.
Albert F. Shields
BY
Samuel Ostrolenk
ATTORNEY.

Patented Jan. 1, 1946

2,392,005

UNITED STATES PATENT OFFICE 2,392,005

PARTITION ASSEMBLING MACHINE

Albert F. Shields, Jamaica, N. Y., assignor to
S. & S. Corrugated Paper Machinery Co., Inc.,
Brooklyn, N. Y., a corporation of New York Application May 3, 1941, Serial No. 391,702

14 Claims. (Cl. 93—37)

This invention relates to container manufacturing apparatus and more particularly to a machine for readily assembling partitions.

In the construction of containers of various kinds, it is sometimes necessary to provide a series of cubicles or partitions separating the container into a series of small containers. This is commonly necessary in containers which are designed for the shipment of a plurality of small, fragile items, each of which must be supported out of contact with adjacent units of the same type and each of which must be positively positioned in the container so that the same is cushioned against any rough handling.

Usually such partitions comprise a series of sheets extending at right angles to each other and notched so that they may intersect each other. In such partitions which are intended to be inserted in containers, there may therefore be two, three or more partitioning sheets extending in one direction and a number of partitioning sheets extending in a direction at right angles thereto.

In the usual type of partition, notches are provided, said notches extending to one edge of each of the sets of sheets running in one direction and the notches extending to the opposite edge of each of the sets of sheets running in the other direction. The notches are arranged so that when the sheets are placed in proper intersecting relation, the notches meet and a portion of the material of each sheet is caught in the corresponding notch of the intersecting sheet.

In order that the surfaces which define the edges of the sheets should be plane, the notches preferably are one-half the height of each of the sheets and the sheets are caused to intersect so that notch meets notch. When the sheets are therefore assembled in intersecting relationship, a regular partition having no projections may therefore be formed.

It is necessary, therefore, in the consideration of any machine which is to be utilized in the assembling of such partition, to allow for the fact that the intersecting elements which form the completed partitions are or may always be placed at right angles to each other and that the simplest method of assembly is one which disposes the sheets so that they may be brought together while the said sheets are at right angles to each other so that no turning or further movement of the sheets in one bank will be necessary for registry with sheets of the opposite banks.

It is therefore an object of this invention to provide an apparatus for assembling partitions wherein the sheets which are to be arranged in intersecting partition form, may be mounted so that the set of sheets which, in the partition, are to run in one direction are appropriately mounted in a plurality of stacks and so that the set of sheets which, in the partition, are intended to run in a direction at right angles to the first set are arranged in a plurality of stacks which are at right angles to the first set of stacks.

A further object of the present invention is the provision in partition assembling apparatus, of means for stacking each set of sheets which are to form the partition in such manner that the stacks are arranged at right angles to stacks of sheets which are to be intersected by sheets from the first stack.

A further object of this invention is to arrange the stacks so that the blanks may be fed by gravity and will not require any further feeding means.

Another object is to eliminate any matrix or carrying member for the assembled cell unit.

Still a further object of the present invention is the provision in partition assembling apparatus, of means for simultaneously assembling all of the sheets which are to form the partition during a single operative movement.

These and many other objects of the present invention will in part be apparent and in part pointed out in the following specification taken in connection with the drawings; in which:

Figures 12, 13:
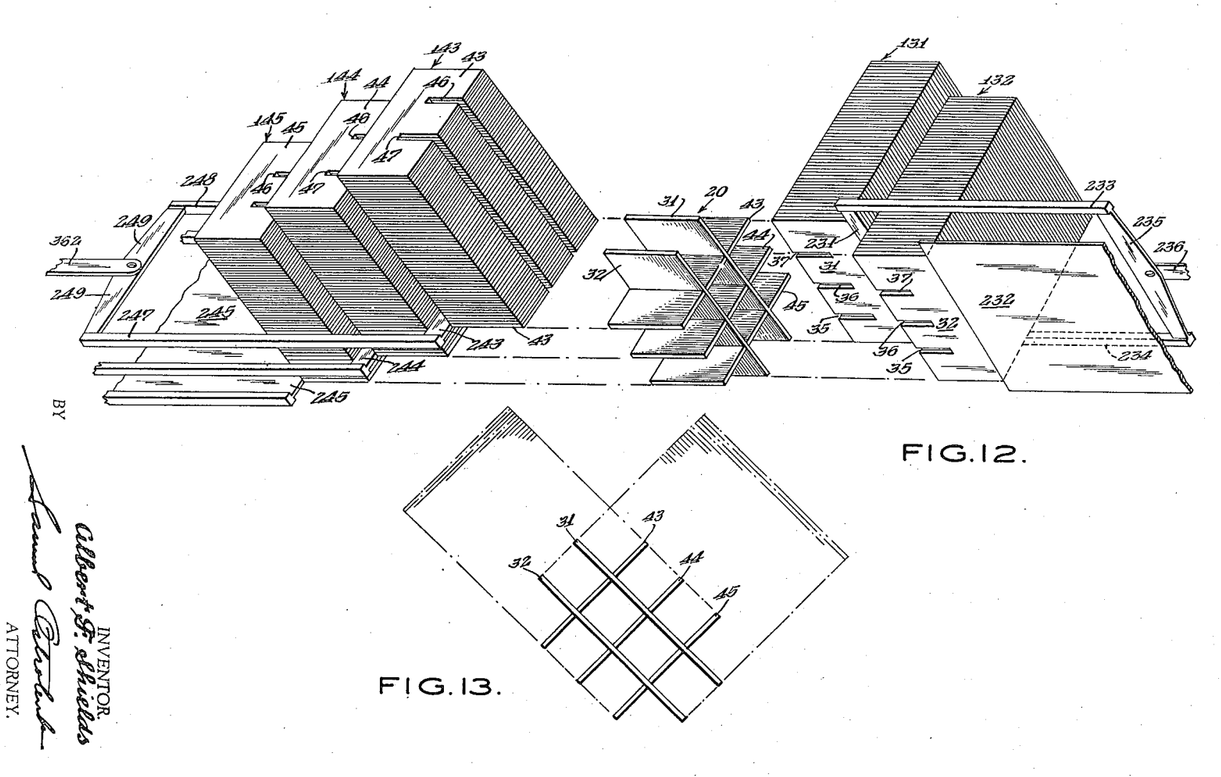
Figures 12 and 13 are a schematic representation of the operation of the mechanism.

Referring now to the schematic view of Figures 12 and 13 which will serve more clearly to explain the invention before the specific apparatus which accomplishes the result therein shown is described—there are shown in these figures an assembled partition 20 consisting of sheets 31 and 32 which extend in one direction and sheets 43, 44 and 45 which extend in the opposite direction.

The sheets which in each assembled partition are eventually to form sheet 31 of the partition herein shown are placed in a stack 131. Likewise the sheets which are to form sheet 32 of the partition 20 are placed in a stack 132. Sheets which are to form the intersecting sheets 43, 44 and 45 of the partition 20 are likewise respectively placed in stacks 143, 144 and 145.

As will be clearly seen in Figure 12, the sheets 43 in stack 143 each have a pair of notches 46 and 47. Likewise each of the sheets 32 of stack 132 have a series of notches 35, 36 and 37. The other sheets in each set of stacks have the same notched arrangement.

Similarly, the bottom of each of the stacks 143, 144 and 145 are spaced apart by the distance desired between the corresponding sheets on their side of the partition assembly. Or, to put it another way, the bottoms of stacks 131 and 132 are spaced apart so that the bottom sheet of stack 131 will register with notches 46 and so that the bottom sheet of stack 132 will register with notches 47; and the bottoms of stacks 143, 144 and 145 are spaced apart so that the bottom sheet of stack 143 extends in a plane which will intersect notches 37; the bottom sheet of stack 144 is in a plane which will intersect notches 36, sheets 32 and 31; and so that the bottom sheet of stack 145 is in a plane which will intersect notches 35 in each of the sheets 32 and 31.

The stacks may, if desired, be so arranged that the bottoms thereof may be spaced from each other by any desired distance in accordance with the distances between the notches above described and in accordance with the number of sheets in each direction which are to enter into the completed partition assembly.

Now in order to utilize this arrangement, I have found it necessary to provide means which will simultaneously move the bottom sheet out of each stack towards the center of the apparatus so that each sheet will be moved to engagement with the notches of the opposite sheet in the manner previously described.

The staggering of the bottom of the stacks shown in Figure 12 normally permits spacing the sheets so that they will intersect, but also provides the necessary clearance for the members which is necessary to move the bottom sheet out from under each stack.

Thus each of the sheets 31 in stack 131 has the same arrangement as sheets 32, and likewise each of the sheets 44 and 45 in stacks 144 and 145 has the same arrangement as sheet 43 of stack 143.

Sheets 31 and 32 are provided with three notches since they are in the completed partition assembly 20 to intersect three cross-sheets, and each of the sheets 43, 44 and 45 has two notches since in the completed partition assembly they are each to intersect only two sheets.

Obviously any number of stacks may be on each side to produce a series of partitions having any other desired arrangement of sheets. As will also readily be seen from Figure 12, each of the stacks 131 and 132 is placed in the apparatus so that the sheets thereof are at right angles to the sheets in each of the stacks 145, 144 and 143.

Preferably, therefore, in the apparatus and in order to enable a gravity feed of all blanks, each of the stacks on one side of the completed partition is arranged at 45° from the vertical on one side of an imaginary vertical line drawn through the apparatus and each of the stacks on the opposite side of the partition to be assembled is placed at an angle of 45° on the other side of said imaginary line.

The bottoms of each of the stacks 131 and 132 are spaced apart by a distance equal to the space desired in the completed partition assembly between the sheets 31 and 32.

In the schematic embodiment shown, I have provided bar 231 which registers with the bottom sheet 31 of stack 131 and plate 232 which registers with the bottom sheet 32 of stack 132. Bar 231 is supported on rails 233 and 234 which are connected at the rear end by a cross bar 235 to which an operating link 236 may be pivotally connected. The rails 233 and 234 surround the stack 132 and are so arranged that the movement of the bar 231 into stack 131 and the movement of the rails necessitated thereby will not in any way interfere with stack 132.

The plate 232 may operate in the same manner as bar 131 but since plate 232 is at the lowest position in the machine where its movement will not interfere with any stacks, it may be a continuous plate and need not be formed in the rail-cross-bar-operating bar arrangement described with respect to bar 231.

Plate 232 and bar 231 are oscillated back and forth so that during each movement towards the left with respect to Figure 12, they simultaneously push out the bottom sheet from each of their respective stacks and so that by each movement towards the right with respect to Figure 12, they are reset in operating position once more with respect to their stacks.

The operation of plate 232 and bar 231 is such that each of the sheets 31 and 32 simultaneously reaches the point where the partition assembly 20 is to be assembled. Since sheet 32 must move through a greater distance, its speed will ordinarily be greater than that of sheet 31. However this difference is reduced by the fact that the mechanism is so arranged in the manner hereinafter described, that plate 232 commences its kicking movement first—before plate 231.

The travel of sheet 32 is necessarily greater than that of sheet 31 since in addition to travelling the distance between the stacks and the point where the partitions are to be assembled, it must also travel through the additional width of stack 131.

The plate and bars are so arranged in their operation, therefore, that sheets 31 and 32 reach their final positions in the assembled state simultaneously. The same operation occurs with respect to stacks 143, 144 and 145. Bar 243 supported by rails 247 and 248, which in turn are braced by the cross bar 249, operates with respect to stack 143. Bar 244 operates with respect to stack 144, and plate 245 operates with respect to stack 145. The same type of operation occurs with respect to these latter bars as has previously been described with respect to bar 231 and plate 232. Here it is necessary that two bars be provided since there are three stacks. The bottom plate is provided instead of a bar for the same reason as has previously been described with respect to the bottom plate 232.

By this operation, therefore, all of the sheets which are to form the partition are ejected from the stacks in such a manner that each sheet registers with all of its intersecting sheets at the end of one movement.

The specific apparatus by which this is accomplished is shown in the remaining figures. Referring now to Figures 1 to 6, inclusive, I have here shown an apparatus in which may be mounted a power source 300 which in any suitable manner, as for instance, by the belt 301, is connected to the pulley 302 which drives the shaft 303. Shaft 303 carries the gear 304 which in turn meshes with gear 305, thus driving shaft 306.

Figure 3:
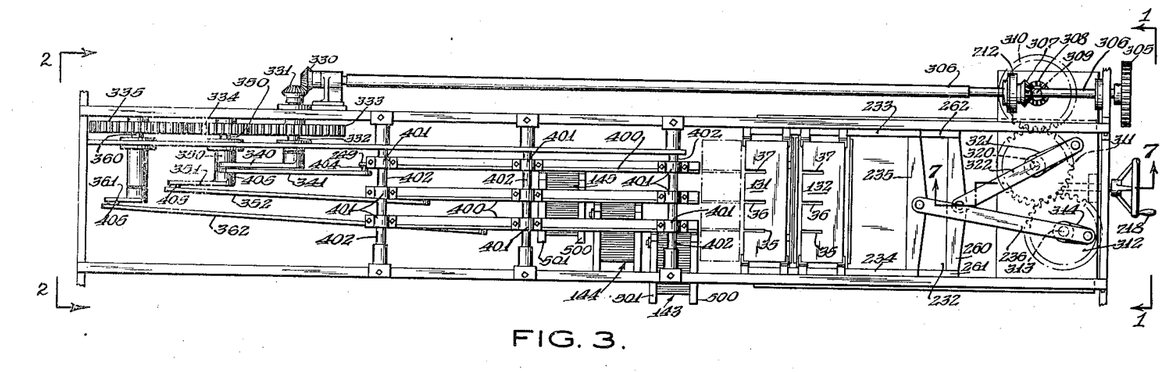
Figure 3 is a side view of the apparatus taken from line 3—3 of Figure 1.

Bevel gear 307 on shaft 306 meshes with bevel gear 308 on the shaft 309 which carries gears 310. Gear 310 drives gear 311 which in turn drives gear 312. Gear 312 is mounted on shaft 313 on which is also mounted the crank 314 to the end of which link 236 is pivotally connected. The opposite end of link 236 is pivotally connected to the cross bar 235 which, through the rails 233 and 234, is connected to the operating bar 231 in the manner previously described.

Rotation of the shaft 313 by the gear train previously described, will result in rotation of the crank 314 and in corresponding oscillation of the link 236 and therefore in corresponding oscillation of the cross bar 231 which will result in the ejecting operation previously described. Gear 311 which is also driven by the gear train in the manner above mentioned, is mounted on shaft 320 to which is secured crank 321.

Link 322 is pivotally connected at one end to the crank 321 and at the opposite end is pivotally connected to the cross bar 260 which carries rails 261 and 262 on which the plate 232 is mounted. Rotation of shaft 320 will, in the manner already mentioned, with respect to cross bar 231, result in an oscillation of the plate 232 also for the purposes above mentioned. Also, as previously described, the rails 233 and 234 carry the cross bar 231 which operates upon the bottom sheet of stack 131. Similarly, plate 232, as previously described, operates upon the bottom sheet in stack 132.

Figure 4:
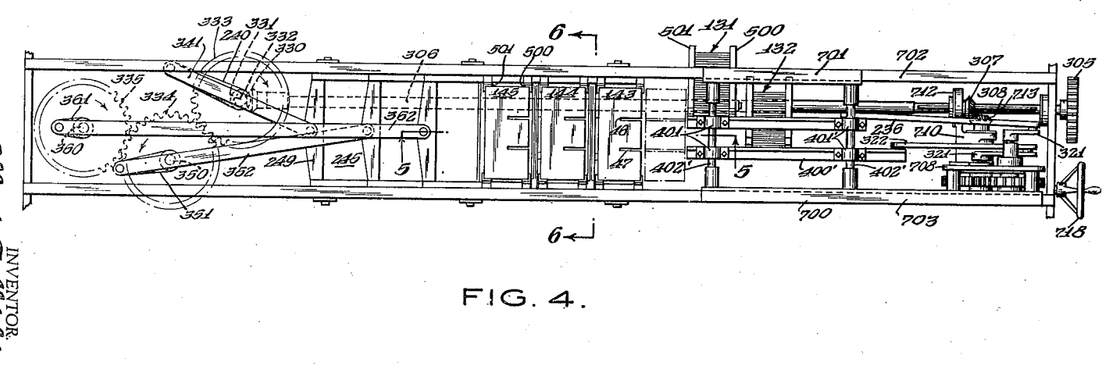
Figure 4 is a side view of the apparatus taken from line 4—4 of Figure 1.

The end of shaft 306 opposite the bevel gear 307 also carries a bevel gear 330 which meshes with bevel gear 331, which in turn is mounted on shaft 332. Shaft 332 carries gear 333 which meshes with gear 334 which, in turn, drives gear 335. Shaft 332 also carries crank 340 keyed thereto and rotatable therewith. Link 341 is at one end pivotally connected to crank 340 and at the opposite end is pivotally connected to the cross bar 249 which drives the operating plate 245 in the manner previously described.

Gear 334 is mounted on shaft 350 on which is also mounted the crank 351. Link 352 is at one end pivotally connected to the crank 350 and at the opposite end is pivotally connected to the members which support the cross bar 244 previously described. Gear 335 is mounted on and operates the shaft 360 on which is also mounted the crank 361. Link 362 is pivotally connected at one end to the crank 360 and at the opposite end is pivotally connected to the members which operate the bar 243 previously described.

In Figure 3, the position of each of the various members is shown when the ejecting operation is commencing, and the partition has not yet been taken from the stack.

It will thus be seen that the members which operate on the lowest stacks have the greatest travel and that the members which operate on the uppermost stacks have the least amount of travel.

Figure 5:
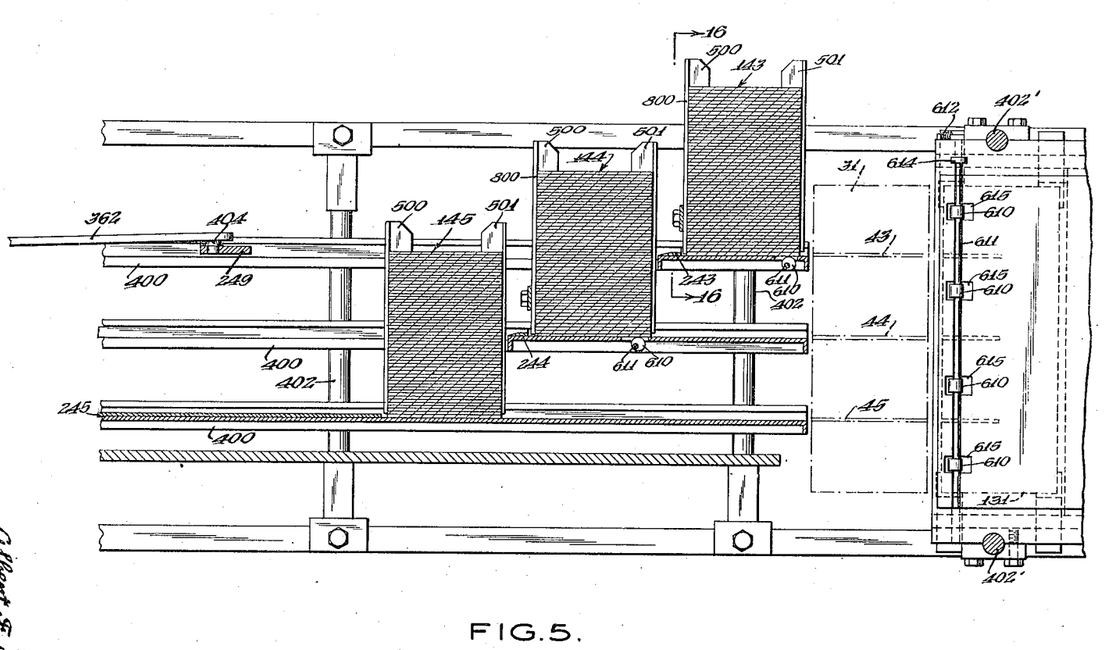
Figure 5 is a cross-sectional view taken along line 5—5 of Figure 4, looking in the direction of the arrows.
Figure 6:
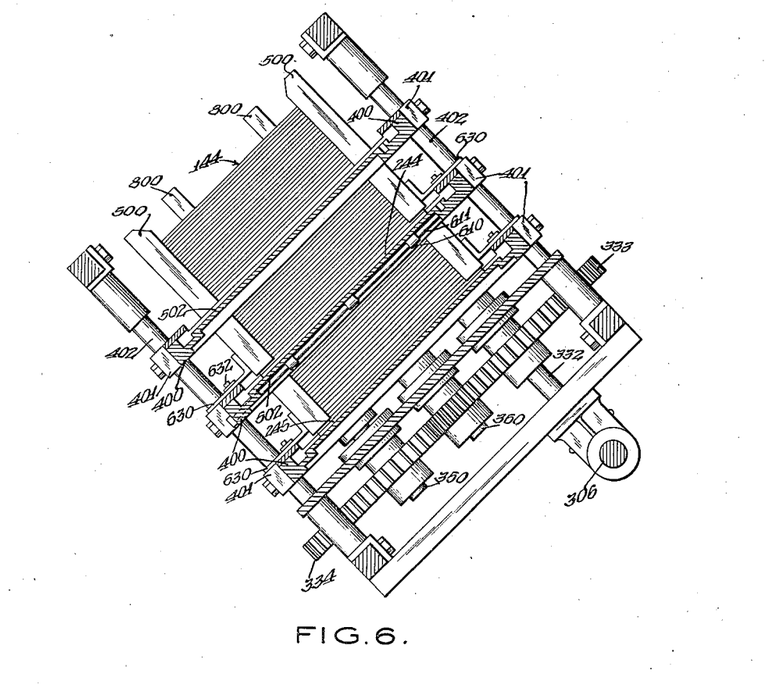
Figure 6 is a cross-sectional view taken along line 6—6 of Figure 4, looking in the direction of the arrows.
Figure 7:
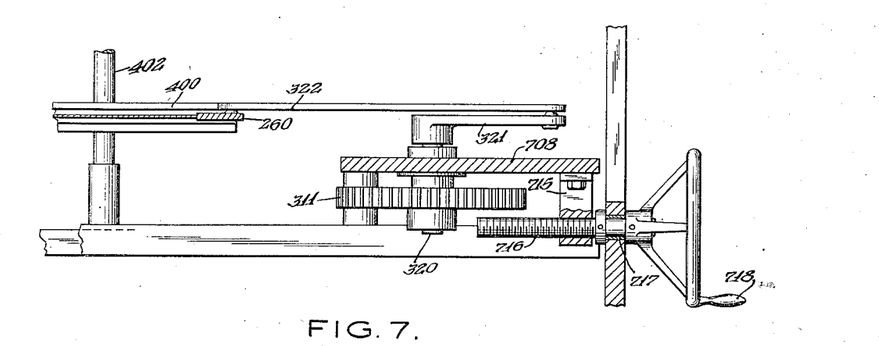
Figure 7 is a cross-sectional view taken along line 7—7 of Figure 3, looking in the direction of the arrows.

As is seen in Figure 5, a plurality of tracks 400 are provided within which the rails of each of the operating members may ride. These tracks are adjustable as follows:

These tracks are adjustable with reference to their spacing to each other in order to accommodate the apparatus to various sizes of partitions and to various arrangements thereof. Each of the tracks has a plurality of mounting members or ears 401 by means of which the said tracks are secured on the post 402. The lugs, ears or mounting members 401 are adjustable on the posts 402 so that the tracks may be spaced apart by any selected distance, thus spacing the ejectors appropriately for each type of partition assembly operation.

The connection between the links and their respective cranks and operating members at for instance 404 (Figure 3) and 405, has sufficient play to permit the movement of the track members on the posts 402 without disconnecting the members from the links or without destroying the operative connection therebetween.

While the pivots 404 and 405 may have a certain amount of compliance to permit such an adjustment, they preferably do not have any lateral compliance so that the operative connection and adjustment remains the same.

As has already been pointed out, any number of stack supporting elements may be provided. The stacks, as may be seen in the figures, are supported by a plurality of front and back plates 500, 501, as well as appropriate side supporting means which may take any suitable form. The plates 500 and 501 are supported, however, in such a manner that they are not in contact with the bottom plate 502 of each of the stack supporting elements but are spaced therefrom by at least the thickness of one of the sheets.

Figure 8:
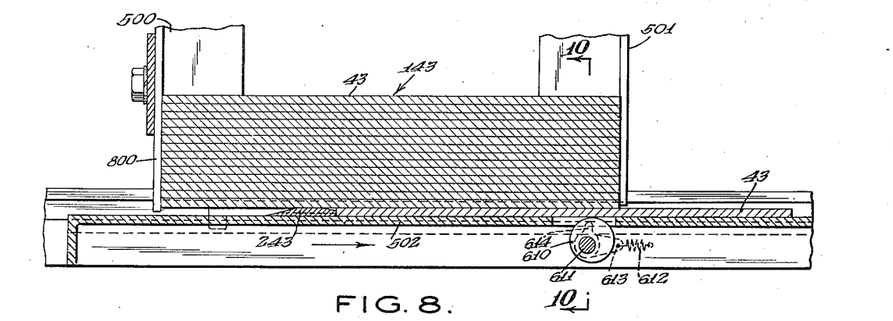
Figure 8 is a fragmentary view showing an enlargement of a portion of the apparatus of Figure 5, in a slightly different position.
Figure 9:
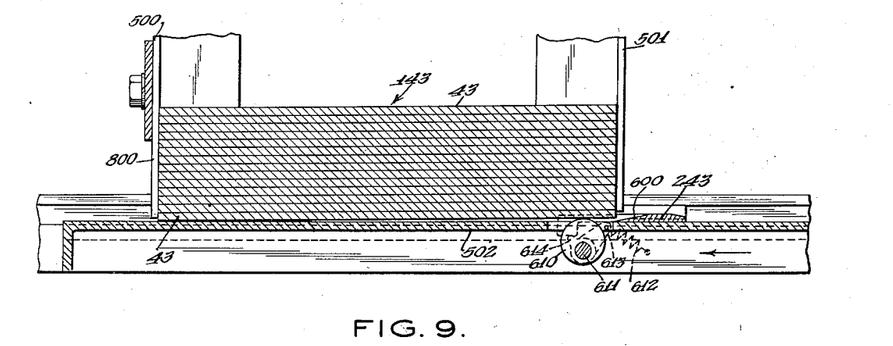
Figure 9 corresponds to Figure 8 showing, however, a different position of the apparatus.

As is seen, therefore, in Figures 8 and 9, the operating bar 243 may therefore in its movement towards the right with respect to Figures 8 and 9, abut against the rear edge of the bottom sheet in the stack and push the same out through the front of the stack. When the bar passes beyond the front of the stack in ejecting the sheet, it then returns beneath the stack and the rear end of the bar at 600 may be chamfered in order to facilitate its sliding under the stack.

In order, however, to ensure that the chamfered edge 600 will readily slide beneath the stack during the return, the cam 610 is provided, which rotates in such a manner as to lift the forward end of the stack, as seen in Figure 9, at the completion of the ejecting movement and immediately before the return. Cam 610 is mounted on shaft 611 which is normally biased to the position shown in Figure 8 by the tension spring 612 which engages the crank 613 on shaft 611.

The shaft 611 carries a small pawl 614 keyed thereto which is engageable with a portion of the operating bar 243. When the operating bar has completed its ejecting movement and is in the position shown in Figure 9, on the return stroke it has, by the cooperation between the operating elements and the pawl 614 rotated the shaft 611 so that the cam has been rotated to the position shown in Figure 9 where it raises the front end of the stack.

Figures 10, 11:
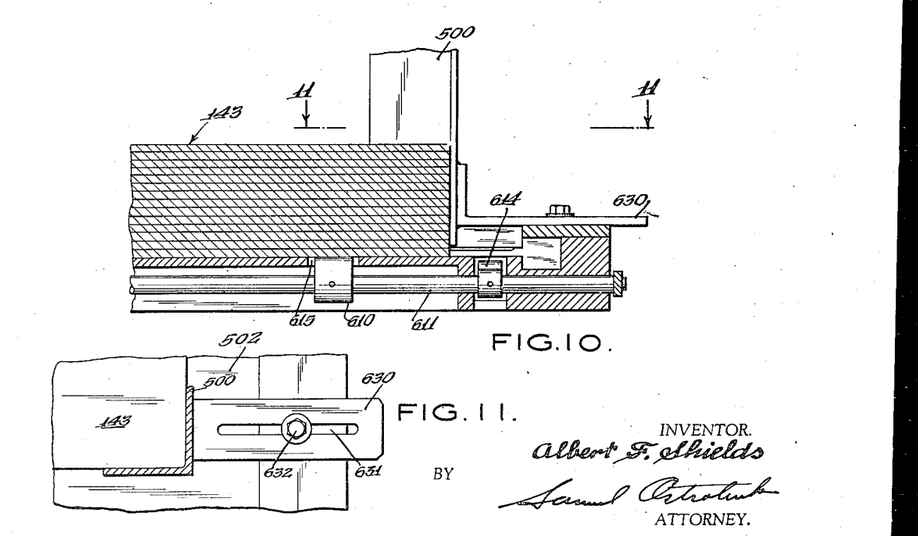
Figure 10 is a cross-sectional view taken on line 10—10 of Figure 8.
Figure 11 is a top cross-sectional view taken from line 11—11 of Figure 10.

As will be seen from Figure 10, the cam operates in a slot 615 in the base plate of the stack. As will also be seen in Figure 5, a plurality of such cam members may be utilized for this purpose. The cam is returned to its original position by the operation of the spring 612 when the ejecting bar has been returned.

The apparatus of my invention may be adjusted for different sizes of partitions. Thus the elements 500 and 501 which define the stack may be mounted on plate 630 having slots 631 with which the adjusting nut 632 cooperates to position the bar and hence the members 500 in appropriate relation for the desired size of sheet.

Figure 1:
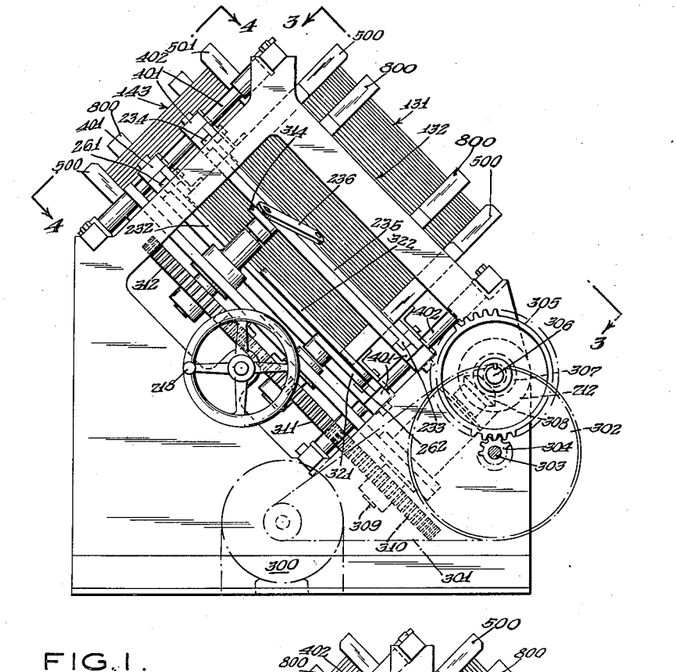
Figure 1 is an end view of one embodiment of the apparatus of my invention, and taken from line 1—1 of Figure 3.
Figure 2:
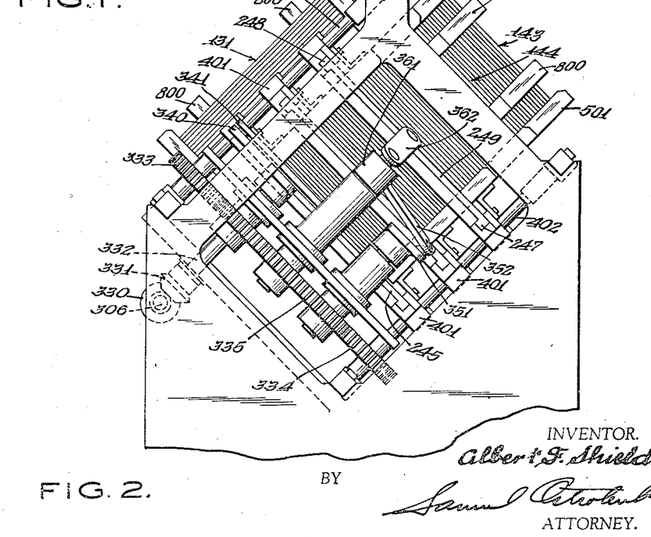
Figure 2 is an end view of the same apparatus on the side opposite the view of Figure 1, and taken from line 2—2 of Figure 3.

In order to adjust the mechanism also for different widths of sheets or for different heights of partitions, I have provided a means shown in Figures 1, 3 and 4 for adjusting the set of stacks 131 and 132 to different positions within the apparatus. The posts 402', 402' (Figure 4) which support the operating members which operate on stacks 131 and 132 are mounted on slide bars 700 and 701 which are slidable on the tracks 702 and 703 of the frame.

The posts 313, 320 and 309 are also mounted on a platform 708 which also is carried between the slide bars 700. A frame member 710 carried by the platform 708 extends upwardly and rotatably engages the hollow sleeve 712 on which the bevel gear 307 rotates. Sleeve 712 is provided with a keyway which registers with the key 713 on shaft 306 so that the bevel gear 307 is rotated by shaft 306 no matter what position the bevel gear and its sleeve 712 occupy with respect to the shaft.

Since the bevel gear 307 and bevel gear 308 are hence supported by the same platform 708, they are always enmeshed with each other so that shaft 306 will always drive bevel gear 303. Accordingly, the slide bars 700, 701 and the platform 708 may be moved inwardly towards the center of the apparatus or outwardly away from the center of the apparatus without in any way interfering with the driving connection.

Hence the platform 708 carries a threaded block 715 in which is engaged the longitudinal screw 716 which rotates in the bearing 717 in the frame of the machine. The end of the longitudinal screw 716 is provided with a handle 718 by which the same may be rotated to adjust the mechanism.

Figures 15, 16:
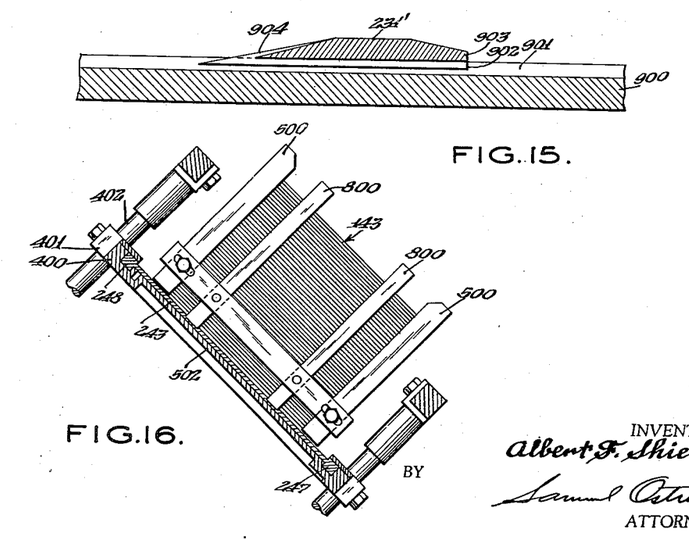
Figure 15 is a cross-sectional view of the apparatus taken along line 15—15 of Figure 14.
Figure 16 is a cross-sectional view taken along line 16—16 of Figure 5.

In addition to using corner stack supporting and positioning elements as shown, for instance in Figure 10, I may also, if that is desired, provide a plurality of stack positioning elements 800, 800 as seen in Figure 16.

The elements of the partition assembly machine may be modified in various ways. Thus, for instance, the base plate 900 of Figure 14 may be provided with a plurality of grooves 901, 901 in which rails 902, 902 of the operating bar 231' may operate. The edge 903 of the bar 231' is intended to serve as the operating or ejecting edge, while the rear edge of the bar is provided with the additional chamfers 904, 904, which because of their very slight slope facilitate the raising of the stack so that no portion of the bottom sheet will be torn during the return.

Figure 14:
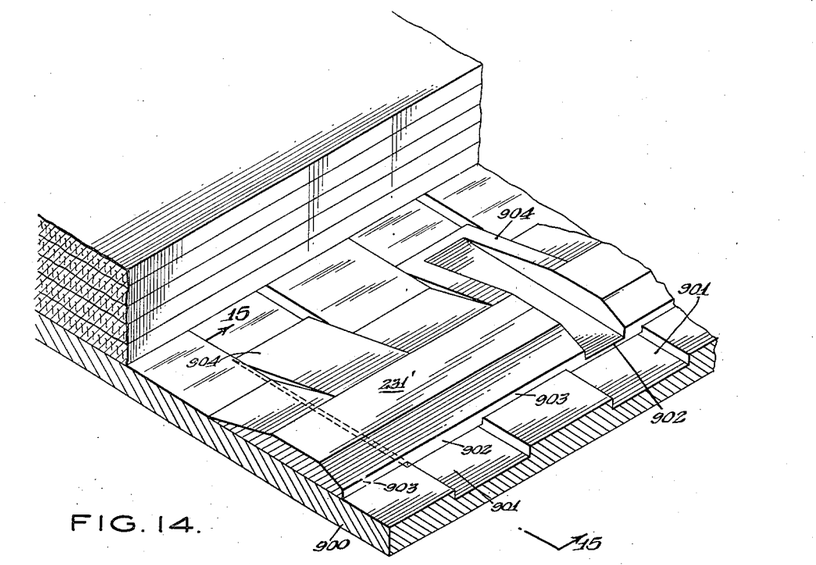
Figure 14 is a view in perspective showing a slightly modified form of a portion of the apparatus of Figures 8 and 9.

By providing the additional chamfers 904, 904, having the slight slope and exerting a minimum of upward pressure during any single instant of movement, it is possible to dispense with the cams previously described.

In the foregoing, I have set forth with respect to Figures 1, 2, 11 and 14 to 16, a complete apparatus which may carry out the principles described with respect to Figures 12 and 13. The basic operation which the apparatus must perform is the ejecting of a plurality of sheets from different stacks in such a manner that one group of sheets will be parallel with each other and intersect at right angles another group of parallel sheets and also in such a manner that corresponding notches in each of the sheets will register.

The operation of each of the elements of the apparatus have been set forth in connection with the specific disclosure thereof. Each of these elements may, however, be varied within the basic principles above defined in a manner which should now be clear to those skilled in the art.

Since my invention therefore is capable of many modifications of which I have shown only the preferred forms, I prefer to be bound not by the specific disclosures herein, but only by the appended claims.

I claim:

1. An apparatus for assembling partitions from a plurality of notched blanks, comprising means for positioning one set of stacks of blanks and an opposite set of stacks of blanks, means for varying the spacing between the sets of stacks, the blanks in the stacks of each set extending in planes parallel to the blanks of each of the stacks of its set; the blanks in one set of stacks extending in planes normal to the blanks of the opposite set of stacks; and means for simultaneously feeding one blank from each stack, blanks from opposite sets being fed toward each other by a single continuous movement from their respective stacks to assembled position.

2. An apparatus for assembling partitions from a plurality of notched blanks, comprising means for positioning one set of stacks of blanks and an opposite set of stacks of blanks, means for varying the spacing between the stacks in one of said sets, the blanks in the stacks of each set extending in planes parallel to the blanks of each of the stacks of its set; the blanks in one set of stacks extending in planes normal to the blanks of the opposite set of stacks; and means for simultaneously feeding one blank from each stack, blanks from opposite sets being fed toward each other into assembled position by a single continuous horizontal movement from their respective stacks to assembled position.

3. An apparatus for assembling partitions from a plurality of notched blanks, comprising means for positioning one set of stacks of blanks and an opposite set of stacks of blanks, the sets of stacks of blanks being spaced from each other by more than the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; and means for simultaneously feeding one blank from each stack, blanks from opposite sets being fed toward each other into assembled position by a single continuous movement from their respective stacks to assembled position.

4. An apparatus for assembling partitions from a plurality of notched blanks, comprising means for positioning one set of stacks of blanks and an opposite set of stacks of blanks, the sets of stacks of blanks being spaced from each other by more than the width of an assembled partition, means for varying the spacing between sets of stacks for partitions of different depth, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation and means for simultaneously feeding one blank from the bottom of each stack, blanks from opposite sets being fed toward each other into assembled position by a single continuous movement from their respective stacks to assembled position.

5. An apparatus for assembling partitions from a plurality of notched blanks, comprising means for positioning one set of stacks of blanks and an opposite set of stacks of blanks, the sets of stacks of blanks being spaced from each other by more than the width of an assembled partition, means for varying the spacing between stacks in a set for partition of different cell size, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets being fed toward each other into assembled position by a single continuous movement from their respective stacks to assembled position.

6. An apparatus for assembling partitions from a plurality of notched blanks, comprising means for positioning one set of stacks of blanks and an opposite set of stacks of blanks, the sets of stacks of blanks being spaced from each other by more than the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets the blanks being fed toward each other into assembled position by a single continuous movement from their respective stacks to assembled position, the blanks of each stack progressively moving downward by gravity as each bottom blank is fed out.

7. An apparatus for assembling partitions from a plurality of notched blanks, comprising means for positioning one set of stacks of blanks and an opposite set of stacks of blanks, the sets of stacks of blanks being spaced from each other by more than the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets, the blanks being fed toward each other into assembled position by a single continuous movement from their respective stacks to assembled position, the blanks of each stack progressively moving downward by gravity as each bottom blank is fed out, and means for adjusting the spaced stepped relation of the bases of each of the stacks for partitions of different cell size.

8. An apparatus for assembling partitions from a plurality of notched blanks, comprising means for positioning one set of stacks of blanks and an opposite set of stacks of blanks, the sets of stacks of blanks being spaced from each other by more than the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets, the blanks being fed toward each other into assembled position by a single continuous movement from their respective stacks to assembled position, the blanks of each stack progressively moving downward by gravity as each bottom blank is fed out and means for moving one set of stacks toward and away from the opposite set for partitions requiring blanks of different depth.

9. An apparatus for assembling partitions from a plurality of notched blanks, comprising means for positioning one set of stacks of blanks and an opposite set of stacks of blanks, the sets of stacks of blanks being spaced from each other by more than the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets the blanks being fed toward each other into assembled position by a single continuous movement from their respective stacks to assembled position, the blanks of each stack progressively moving downward by gravity as each bottom blank is fed out, and means for adjusting the stack supporting means to position blanks of varying lengths for partitions requiring blanks of different length.

10. An apparatus for assembling partitions from a plurality of notched blanks, comprising means for positioning one set of stacks of blanks and an opposite set of stacks of blanks, the sets of stacks of blanks being spaced from each other by more than the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets the blanks being fed toward each other into assembled position by a single continuous movement from their respective stacks to assembled position, the blanks of each stack progressively moving downward by gravity as each bottom blank is fed out, and means for adjusting the apparatus for partitions of varying cell sizes.

11. An apparatus for assembling partitions from a plurality of notched blanks, comprising means for positioning a plurality of aligned stacks, the bases of said stacks being stepped upwardly toward the position of assembly, means for feeding a blank by a continuous movement from the bottom of each stack into said position of assembly comprising a kicker individual to each stack and normally positioned in the space between said stack and the adjacent stack, each kicker being movable simultaneously with the other kickers to eject blanks from the bottoms of the stacks, and to cause said blanks simultaneously to reach the position of assembly.

12. An apparatus for assembling partitions from a plurality of notched blanks, comprising means for positioning a plurality of aligned stacks, the bases of said stacks being stepped upwardly toward the position of assembly, means for feeding a blank from the bottom of each stack toward said position of assembly comprising a kicker individual to each stack and normally positioned in the space between said stack and the adjacent stack, each kicker being movable simultaneously with the other kickers to eject blanks from the bottoms of the stacks, said kickers being operable from a common power source and at different speeds to cause said blanks simultaneously to reach the position of assembly.

13. An apparatus for assembling partitions from a plurality of notched blanks, comprising means for positioning a plurality of aligned stacks, the bases of said stacks being stepped upwardly toward the position of assembly, means for feeding a blank by a continuous movement from the bottom of each stack into said position of assembly comprising a kicker individual to each stack and normally positioned in the space between said stack and the adjacent stack, each kicker being movable simultaneously with the other kickers to eject blanks from the bottoms of the stacks and members for supporting and moving said kickers, said members operating outside of said line of stacks and clearing said stacks.

14. An apparatus for assembling partitions from a plurality of notched blanks, comprising means for positioning a plurality of aligned stacks, the bases of said stacks being stepped upwardly toward the position of assembly, means for feeding a blank from the bottom of each stack toward said position of assembly comprising a kicker individual to each stack and normally positioned in the space between said stack and the adjacent stack, each kicker being movable simultaneously with the other kickers to eject blanks from the bottoms of the stacks, said kickers being operable from a common power source and at different speeds to cause said blanks simultaneously to reach the position of assembly and means for lifting said stacks during a portion of the movement of the kicker.

ALBERT F. SHIELDS.